July 23, 1957  T. J. KLUCK  2,800,046
TOOL HOLDER AND MOUNTING MEANS THEREFOR
Filed Aug. 24, 1953
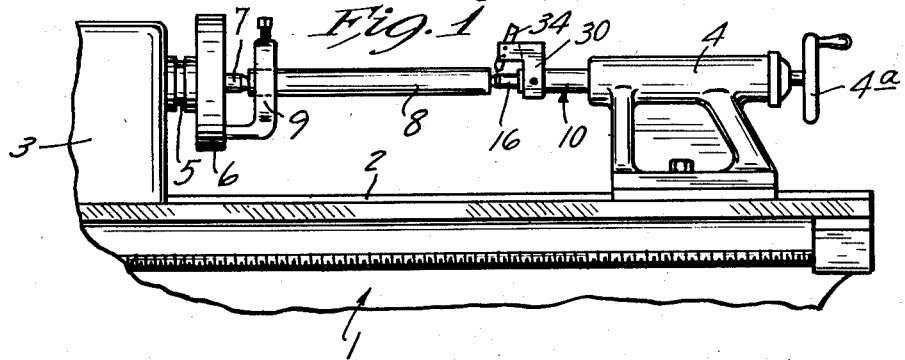
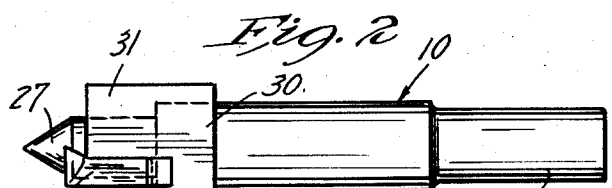
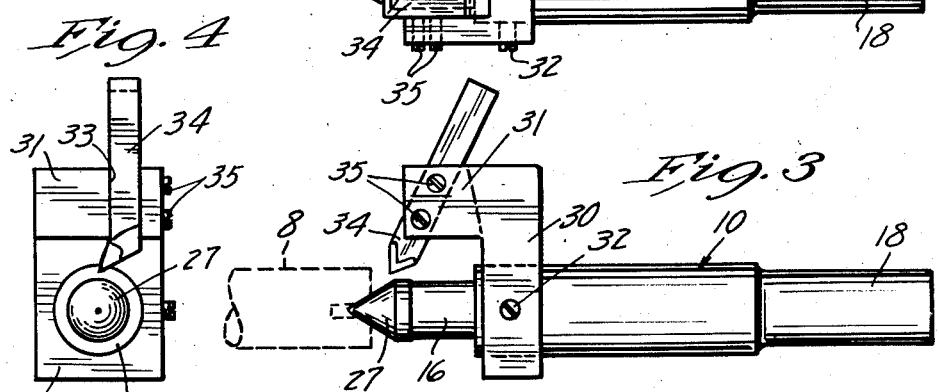
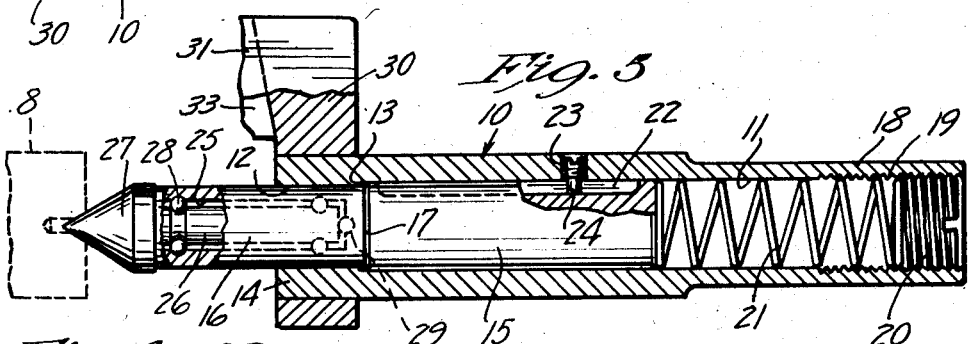
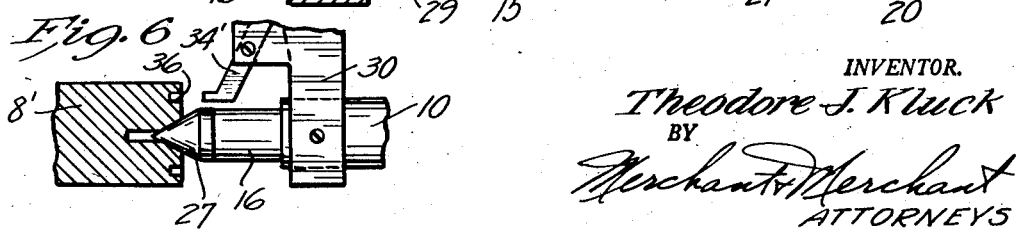
INVENTOR.
Theodore J. Kluck
BY
Merchant & Merchant
ATTORNEYS

United States Patent Office 2,800,046
Patented July 23, 1957

2,800,046

TOOL HOLDER AND MOUNTING MEANS THEREFOR

Theodore J. Kluck, Minneapolis, Minn., assignor of one-third to James W. Olson, and one-third to Charles O. Bader, Minneapolis, Minn.

Application August 24, 1953, Serial No. 376,109

1 Claim. (Cl. 82—35)

My invention relates generally to tool holders for lathes, drill presses and the like, and more specifically to a tool holder which is mounted in the tailstock of a lathe for operation on a work piece held in the lathe.

An important object of my invention is the provision of a tool holder and mounting means therefor which can be quickly and easily applied to a lathe tailstock or a drill press chuck.

Another object of my invention is the provision of a tool holder and mounting means therefor which will support the work piece in close proximity to the cutting edge of the tool whereby to achieve a smooth cut and close machining tolerances.

A still further object of my invention is the provision of a tool holder as set forth which is relatively simple and inexpensive to produce, which is highly efficient in operation, and which is rugged in construction and durable in use.

The above and still further highly important objects and advantages of my invention will become apparent from the following detailed specification, appended claims and attached drawings.

Referring to the drawings, which illustrate the invention, and in which like numerals indicate like parts throughout the several views:

Fig. 1 is a fragmentary view in front elevation of an engine lathe showing my novel tool holder applied thereto;

Fig. 2 is a view in plan of the tool holder and work piece support of my invention;

Fig. 3 is a view in front elevation of the structure of Fig. 2;

Fig. 4 is a view in end elevation as seen from the left to the right with respect to Fig. 3;

Fig. 5 is an enlarged view corresponding substantially to Fig. 3, some parts being broken away and some parts being shown in section; and Fig. 6 is a view corresponding to a portion of Fig. 3, some parts being broken away and some parts shown in section, and showing a different form of cutting tool.

Referring with greater detail to the drawings, a conventional metal turning or engine lathe is indicated in its entirety by the numeral 1, and is shown as comprising a lathe bed 2, a headstock 3 and a tailstock 4. A spindle 5 is journalled in the headstock 3 and may be assumed to be rotated from a source of power, not shown. Mounted on one end of the spindle 5 is a face plate 6 and an axially projecting live center 7. A work piece 8 is center drilled at one end whereby to engage the live center 7 and is shown as being connected to the face plate 6, for common rotation therewith, by a conventional lathe dog 9. Obviously, the work piece 8 may be held by other well-known means at its end adjacent the headstock 3, by means of a collet or chuck.

In the preferred form of the invention illustrated, my novel cutting tool holder incorporates a mounting shank or sleeve 10 which may be rigidly mounted for axial movements in the tailstock 4 by means of a conventional taper shank or the like, not shown. If desired, the shank 10 may be tapered to fit directly into the tailstock 4. The shank 10 is axially bored to provide a socket 11, said socket having a diametrically reduced portion 12 at one end thereof. The bore 11 and reduced portion 12 define an annular shoulder 13 adjacent said one end 14 of the shank 10. Mounted for axial sliding movements in the bore 11 is a rigid bar 15 having a diametrically reduced front end portion 16. Said bar 15 and reduced end portion 16 define an annular shoulder 17 which is engageable with the shoulder 13 upon movement of the bar 15 in one direction. The rear end portion 18 of the shank 10 is internally threaded as at 19 to receive a threaded plug or the like 20 between which and the adjacent end of the shank 15 is interposed a coil compression spring 21. The spring 21 yieldingly urges the shank 15 in a forward direction toward engagement of its annular shoulder 17 with the internal annular shoulder 13. It will be noted that the threaded plug 20 may be moved toward or away from the bar 15 whereby to place the spring 21 under greater or lesser load, thereby adjusting the yielding force applied to the bar 15 in a forward direction. As shown in Fig. 5, the bar 15 is formed to provide an axially extending channel or keyway 22. A key in the nature of a set screw or the like 23 is screw threaded into the shank 10 intermediate its ends, and has an axially projecting key-acting portion 24 contained in the keyway 22 to hold the bar against relative rotary movement in the socket 11, but permitting free axial movement of the bar 15.

The diametrically reduced end portion 16 of the shank 15 is formed to provide an axial bore 25 in which is mounted the shaft portion 26 of a tapered centering head 27. Preferably and as shown, conventional antifriction bearings 28 and a thrust bearing 29 permit free rotation of the centering head 27 and its shaft 26 with respect to the bar 15. Preferably, the sizes of the bore 11 and the reduced portion 12 thereof together with the diameters of the bar 15 and reduced end 16 thereof are held to very close tolerances, so that there is a minimum of working clearance therebetween. The fit of the bearings 28 with their cooperating parts also is such that lateral shifting movement of the head 27 with respect to the shank 10 is held to a minimum.

Rigidly mounted on the front end portion 14 of the shank 10 is a tool holder 30 which has integrally formed therewith an angular portion 31 which extends generally parallel to the shank in radially spaced relation to the projected end portion 16 of the bar 15. The tool holder 30 is movable axially of the shank 10 and is preferably locked in desired set position thereon by suitable means such as a set screw or the like 32. The forwardly projected portion 31 of the tool holder 30 is bifurcated to provide a slot or channel 33 in which is mounted a conventional cutting tool 34. A pair of set screws or the like 35 are utilized to securely hold the cutting tool 34 in desired set position within the channel 33. The depth of the channel 33 is such that the tool 34 may be moved to various desired positions therein, so as to adapt the same for machining work pieces of various diameters. With reference to Figs. 1, 3 and 5, it will be seen that the centering head 27 engages the rear center drilled end of the work piece 8, thus cooperating with the live center 7 to support the work piece during the machining operation.

When the work piece 8 is properly supported between the live centering 7 and the centering head 27, and the cutting tool 34 is locked in its desired set position, the tool holder 30 and cutting tool 34 are fed in the direction of the work piece 8 by manipulation of the hand wheel 4a on the tailstock 4. The hand wheel 4a is of the type commonly formed on lathes for moving the dead center thereof toward and away from the work piece.

As the shank 10, with the tool holder and cutting tool mounted thereon, are advanced toward the work piece 8, relative retraction of the bar 15 against bias of the spring 21 occurs. The spring 21 is of sufficient strength to prevent any relative movement between the work piece and the centering head 27 and as the cutting tool moves over the adjacent end portion of the work piece 8, the desired machining cut is made with great accuracy and a relatively smooth finish is obtained on the work piece. With the use of this device I have been able to turn end portions of work pieces to such a high degree of accuracy and finish, both as to diametrical dimension and concentricity, that finish grinding on the turned portion is usually not necessary. This particular type of tool mounting has virtually eliminated chattering between the cutting tool and the work piece and consequent poor finish, as sometimes otherwise occurs when the work piece is not supported in closely spaced relation to the cutting tool.

Fig. 6 illustrates the use of a different shaped cutting tool 34' that is anchored in the tool holder 30. This cutting tool is particularly adapted for cutting an annular groove 36 in the end surface of a work piece 8'. Like the structure of Figs. 1 to 5 inclusive, that of Fig. 6 includes the shank 10, extended bar portion 16 and the centering head 27 associated therewith. Obviously, any desired type of cutting tool may be utilized in connection with the above described structure.

My invention has been thoroughly tested and found to be completely satisfactory for the accomplishment of the objectives set forth; and while I have shown and described a commercial form of the invention, it will be understood that the same is capable of modification without departure from the spirit and scope of the invention as defined in the claim.

What I claim is:

In a device of the class described, a hollow mounting shank adapted to be rigidly mounted in the tailstock of a lathe, said shank having an axial bore therethrough, said bore being diametrically reduced at one end portion to define an internal annular shoulder and being internally threaded at its opposite end portion, a rigid bar mounted in the bore of said shank for axial movements therein, said bar having one end projecting axially through the reduced end portion of the bore and having an annular shoulder engaging the shoulder of said bore to limit movement of said bar in one direction axially of said bore, means locking said bar against rotation in said bore but permitting said axial movement thereof, an abutment screw threaded into the threaded open end of said shank, a compression spring interposed between said abutment and the adjacent end of said bar and yieldably urging the bar into engagement of its shoulder with the shoulder of said bore, said abutment being movable in the threaded portion of the shank to vary the bias of said spring against the bar, a shaft journalled for rotation in the bar on the axis of said shank, said shaft terminating in a work piece engaging tapered centering head, an angular tool holder longitudinally slidably mounted on one end of the shank, said tool holder having a tool supporting portion extending generally parallel to said shank in radially spaced relation to the projected portion of said bar, and means for releasably locking said tool holder in desired set positions longitudinally of said shank.

References Cited in the file of this patent
UNITED STATES PATENTS

| | | |
|---|---|---|
| 944,876 | Key | Dec. 28, 1909 |
| 1,285,350 | Palmgren | Nov. 19, 1918 |
| 1,469,500 | Delong | Oct. 2, 1923 |
| 1,613,161 | Cockburn | Jan. 4, 1927 |
| 2,520,473 | Shepard | Aug. 29, 1950 |
| 2,564,256 | Henderhan | Aug. 14, 1951 |

FOREIGN PATENTS

| | | |
|---|---|---|
| 112,850 | Great Britain | Jan. 31, 1918 |
| 179,038 | Great Britain | May 4, 1922 |